US007666548B2

(12) United States Patent
Kim

(10) Patent No.: US 7,666,548 B2
(45) Date of Patent: Feb. 23, 2010

(54) CAN TYPE SECONDARY BATTERY

(75) Inventor: Bong Ki Kim, Cheosan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 82 days.

(21) Appl. No.: 11/046,339

(22) Filed: Jan. 27, 2005

(65) Prior Publication Data

US 2005/0164079 A1 Jul. 28, 2005

(30) Foreign Application Priority Data

Jan. 27, 2004 (KR) ...................... 10-2004-0004929

(51) Int. Cl.
*H01M 2/08* (2006.01)
*H01M 2/04* (2006.01)

(52) U.S. Cl. ......................... 429/174; 429/72; 429/175; 429/185

(58) Field of Classification Search ....................... None
See application file for complete search history.

(56) References Cited

U.S. PATENT DOCUMENTS 6,361,898 B1 * 3/2002 Honegger ................... 429/185
6,447,949 B2 * 9/2002 Iwata et al. ................. 429/185
2002/0004168 A1 * 1/2002 Iwata et al. ................. 429/176
2004/0126661 A1 * 7/2004 Nagayama et al. .......... 429/224

FOREIGN PATENT DOCUMENTS

JP 2001-297739 10/2001
KR 2001029156 * 4/2001

OTHER PUBLICATIONS

Patent Abstracts of Japan for Publication No. 2001-297739; Date of publication of application Oct. 26, 2001, in the name of Harunobu Sumioki et al.

* cited by examiner

*Primary Examiner*—John S Maples
(74) *Attorney, Agent, or Firm*—Christie, Parker & Hale, LLP

(57) ABSTRACT

A can type secondary battery includes an electrode assembly having a positive electrode plate, a negative electrode plate, and a separator interposed between the positive electrode plate and the negative electrode plate, a can for receiving the electrode assembly therein, and a cap assembly coupled to an opening section of the can. A cap plate is formed with an electrolyte injection hole and a soft aluminum plug welded to the electrolyte injection hole so as to seal the electrolyte injection hole.

5 Claims, 6 Drawing Sheets

CAN TYPE SECONDARY BATTERY

CROSS-REFERENCE TO RELATED APPLICATION

This application claims priority to and the benefit of Korean patent application 2004-00004929 filed in the Korean Intellectual Property Office on Jan. 27, 2004, the entire content of which is incorporated herein by reference.

BACKGROUND OF THE INVENTION

1. Field of the Invention

The present invention relates to a can type secondary battery, and more particularly to a sealing structure for an electrolyte injection hole of a can type secondary battery.

2. Description of the Related Art

Secondary batteries are rechargeable batteries which can be fabricated in a compact size with large capacity. Among various secondary batteries, nickel-metal hydride (Ni—MH) batteries and lithium-ion (Li-ion) batteries have been developed and used as can type secondary batteries. Secondary batteries may be classified into various types, depending on an electrolyte used. Such electrolytes may be, for example, a liquid electrolyte, a solid polymer electrolyte or a gel-phase electrolyte.

In the case of a lithium secondary battery using a liquid electrolyte, a non-aqueous type liquid electrolyte must be used due to a reaction between lithium and water ($H_2O$). Since the lithium secondary battery uses the non-aqueous type liquid electrolyte, the lithium secondary battery is not subject to decomposition voltage of water during a charging operation thereof, so that the lithium secondary battery has relatively high battery voltage.

Liquid electrolytes are composed of lithium salts dissociated in an organic solvent. The organic solvent may include ethylene carbonate, propylene carbonate, carbonate containing an alkyl group, or organic compounds similar to the above components.

A lithium secondary battery using a solid electrolyte may not create leakage of the solid electrolyte. However, similarly to a general chemical battery, it is desirable for a can type lithium ion secondary battery using the liquid electrolyte to prevent the liquid electrolyte from being leaked. In particular, since the lithium ion secondary battery may be used as a power source for a portable telephone, a computer, a PDA, and a camcorder, which are expensive electronic appliances, the leakage of the liquid electrolyte is a problem to be solved.

Typically, leakage of the liquid electrolyte is created in a welding section between a can and a cap assembly and an electrolyte injection hole of the cap assembly in the can type secondary battery.

FIG. 1 is a partial sectional view showing an upper portion of a can type secondary battery including an electrolyte injection hole 112 of a cap plate 110 and a plug.

Referring to FIG. 1, after the electrode assembly 12 has been inserted into a can 11, an opening of the can 11 is sealed by means of a cap assembly 100. The cap assembly 100 is bonded to the can 11 by welding such that the opening of the can 11 is covered with the cap assembly. The electrolyte injection hole 112 is formed in the cap plate 110 of the cap assembly 100. After the cap assembly 100 is welded to the can 11, an electrolyte is injected into the can 11 through the electrolyte injection hole 112. Then, a plug 160 in the form of a ball is press-fitted into the electrolyte injection hole 112 so as to seal the electrolyte injection hole 112. The plug 160 is press-fitted into the electrolyte injection hole 112 formed at one side of the cap plate 110 and is welded to the cap plate 110. Welding the plug 160 to the cap plate 110 is necessary because otherwise the electrolyte may leak through a fine gap formed between the plug 160 and the cap plate 110 even if the plug 160 is mechanically press-fitted into the electrolyte injection hole 112.

The cap plate 110 and the ball forming the plug 160 are typically made from aluminum. Since aluminum has superior electrical and thermal conductive properties, laser welding is typically used for welding the plug 160 to the cap plate 110. When a laser beam is irradiated onto a welding section formed at an edge of the plug 160, the plug 160 and an inner portion of the electrolyte injection hole 112 formed in the cap plate 110 are partially welded, so that the plug 160 is welded to the cap plate 110.

Recently, a can has been made having a reduced size for a lighter weight and higher battery capacity. Accordingly, a cap plate having a thickness less than 1 mm has been recently fabricated. If the thickness of the cap plate is reduced, mechanical strength of the cap plate is lowered and the possibility of deformation of the cap plate caused by external force is increased. In particular, in the case of a can type secondary battery in which a safety vent is formed in the cap plate rather than in a lower portion of the can, if the safety vent is positioned adjacent to a processing area of the cap plate, the cap plate may be extremely deformed by external forces from processing the cap plate.

If the cap plate is easily deformed by external forces applied to it during a manufacturing process, a crack may form in the welding section and certain processing steps, such as welding, may not be easily carried out. Thus, the electrolyte may leak as a result of welding failure.

FIG. 2 is a partial sectional view showing the problem created in the vicinity of an electrolyte injection hole when the can is sealed by means of an aluminum ball press-fitted into the electrolyte injection hole. FIG. 3 is a partial sectional view showing a problem when welding work is carried out with respect to a sealed section as shown in FIG. 2.

Referring to FIGS. 2 and 3, a predetermined portion of the cap plate 110 adjacent to the electrolyte injection hole is depressed as the aluminum ball is press-fitted into the electrolyte injection hole. In addition, the aluminum ball forming a plug 160' is not sufficiently inserted into the electrolyte injection hole, and an upper portion of the aluminum ball is upwardly protruded from an upper surface of the cap plate 110. In addition, a lower portion of the electrolyte injection hole formed in the cap plate 110 becomes wider so that a predetermined portion of the aluminum ball inserted into the electrolyte injection hole. In other words, an outer surface of the plug 160' does not make close contact with an inner wall of the electrolyte injection hole, but rather, only makes contact with an inlet portion of the electrolyte injection hole. Accordingly, the sealing function of the plug 160' for the electrolyte injection hole may deteriorate. As a result, the electrolyte contained in the can may flow up to the inlet portion of the electrolyte injection hole and a gap may be formed between the plug 160' and the electrolyte injection hole at the inlet portion of the electrolyte injection hole. In particular, if pressing force applied to the aluminum ball causes the deformation of the battery, leakage of the electrolyte may occur.

In addition, although the electrolyte will not leak to an upper surface of the cap plate 110, the gap formed between the plug 160' and the electrolyte injection hole may fill up with the electrolyte. If welding work is then carried out with respect to the welding section formed between the plug 160' and the cap plate 110 forming the inner wall of the electrolyte injection hole, the weld may be less reliable if the electrolyte contaminates the welding section formed between the plug 160' and the electrolyte injection hole. In addition, as shown in FIG. 3, an impurity area 162 called "spatter" is formed in the contaminated welding section which may allow electrolyte to be leaked through the impurity area or a pinhole formed in the welding section after the impurity area is removed from the welding section. Otherwise, external humidity or oxygen may penetrate into the can through the pinhole, thereby causing swelling. Therefore a need exists for a can type secondary battery capable of reliably sealing an electrolyte injection hole.

SUMMARY OF THE INVENTION

One exemplary embodiment of the present invention provides a can type secondary battery capable of reliably sealing an electrolyte injection hole by preventing a cap plate from being deformed when a ball is press-fitted into the electrolyte injection hole in a slim-sized can type secondary battery.

Another exemplary embodiment provides a can type secondary battery capable of preventing a welding section formed between a cap plate and a can from being deteriorated by preventing the cap plate from being deformed when a ball is press-fitted into an electrolyte injection hole.

Yet another exemplary embodiment of the present invention provides a can type secondary battery capable of preventing "spatter" when welding work is carried out with respect to a welding section formed between an electrolyte injection hole and a plug.

A can type secondary battery is provided comprising: an electrode assembly including a positive electrode plate, a negative electrode plate, and a separator interposed between the positive electrode plate and the negative electrode plate; a can for receiving the electrode assembly therein; and a cap assembly coupled to an opening section of the can, and including a cap plate formed with an electrolyte injection hole and a plug welded to the electrolyte injection hole so as to seal the electrolyte injection hole, wherein the plug includes soft aluminum.

According to the exemplary embodiment of the present invention, at least a part of the plug includes soft aluminum, and the soft aluminum is subject to a softening process at an argon atmosphere.

The soft aluminum ball has a Vickers hardness value of less than 27, preferably, identical to or less than 26 when measured by a micro hardness tester.

The cap plate is made from aluminum or an aluminum alloy and has a thickness of identical to or less than 1 mm.

According to an exemplary embodiment of the present invention, the plug is formed by press-fitting a soft aluminum ball into the electrolyte injection hole, and a height of an upper portion of the plug protruding from an upper surface of the cap plate is equal to or less than 0.15 mm. If the upper portion of the plug has a height exceeding 0.15 mm, it is difficult to ensure welding uniformity in the next laser welding process, or a predetermined area of the plug may be insufficiently melted, thereby creating pinholes.

When the cap plate and the plug are made from an aluminum alloy, the cap plate is welded to the plug through spot welding or continuous laser welding.

DETAILED DESCRIPTION OF THE INVENTION

Figure 1:
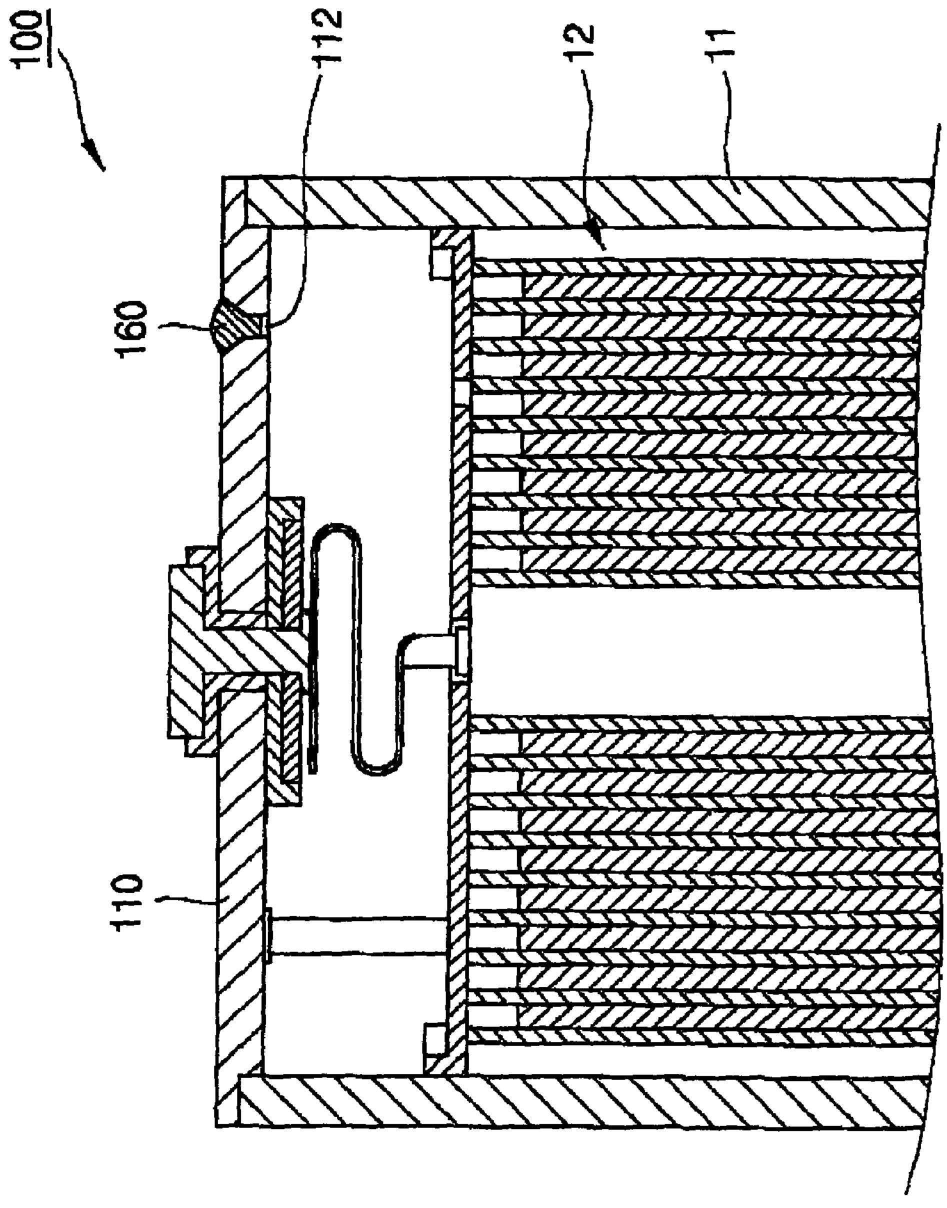
FIG. 1 is a partial sectional view showing an upper portion of a can type secondary battery including a conventional electrolyte injection hole of a cap plate and a plug.
Figure 2:
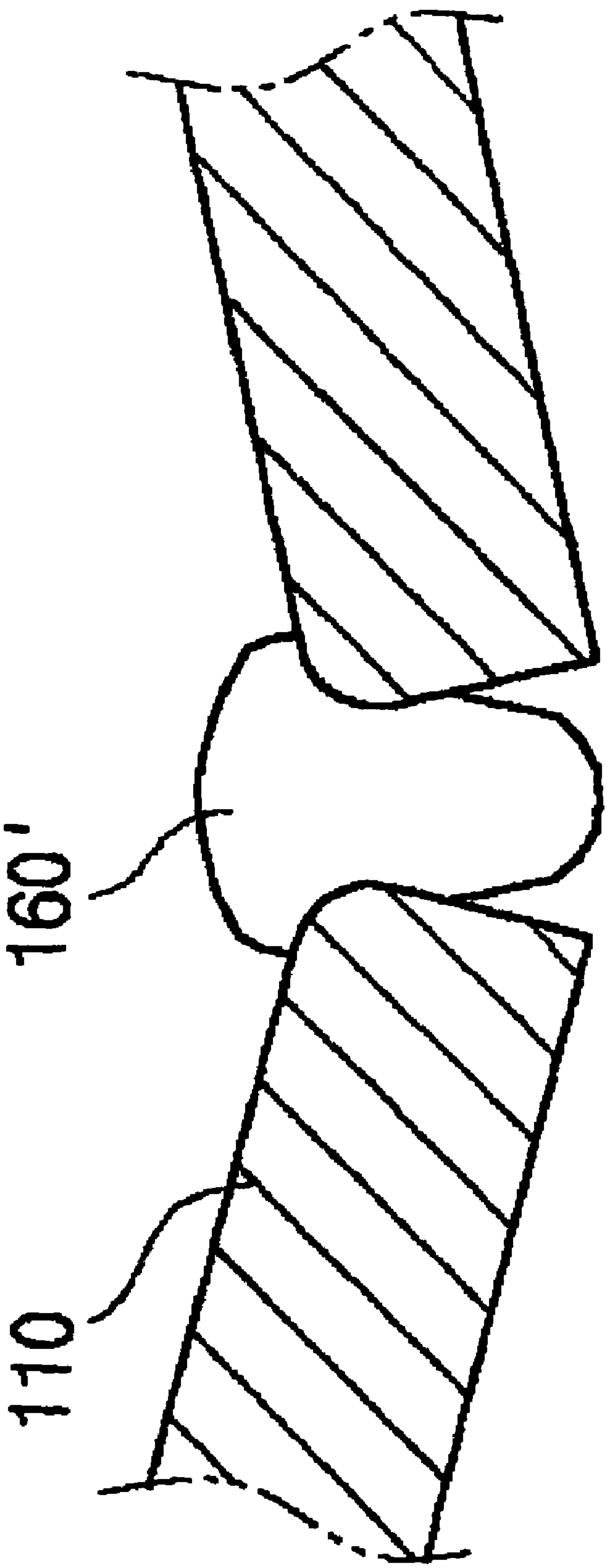
FIG. 2 is a partial sectional view showing a problem created in the vicinity of a conventional electrolyte injection hole when the can is sealed by means of an aluminum ball press-fitted into the electrolyte injection hole.
Figure 3:
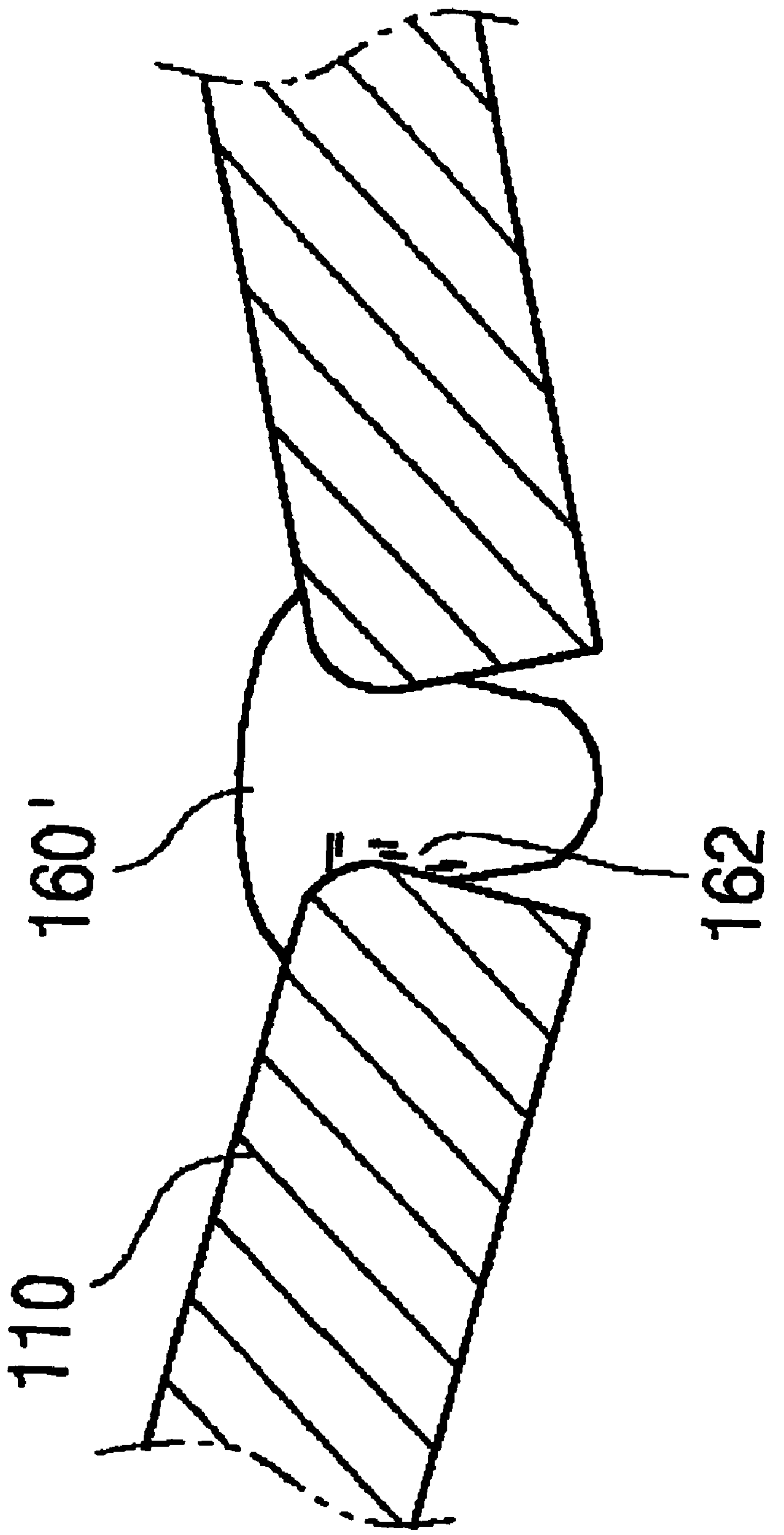
FIG. 3 is a partial sectional view showing a problem when welding work is carried out with respect to a sealed section as shown in FIG. 2.
Figure 4:
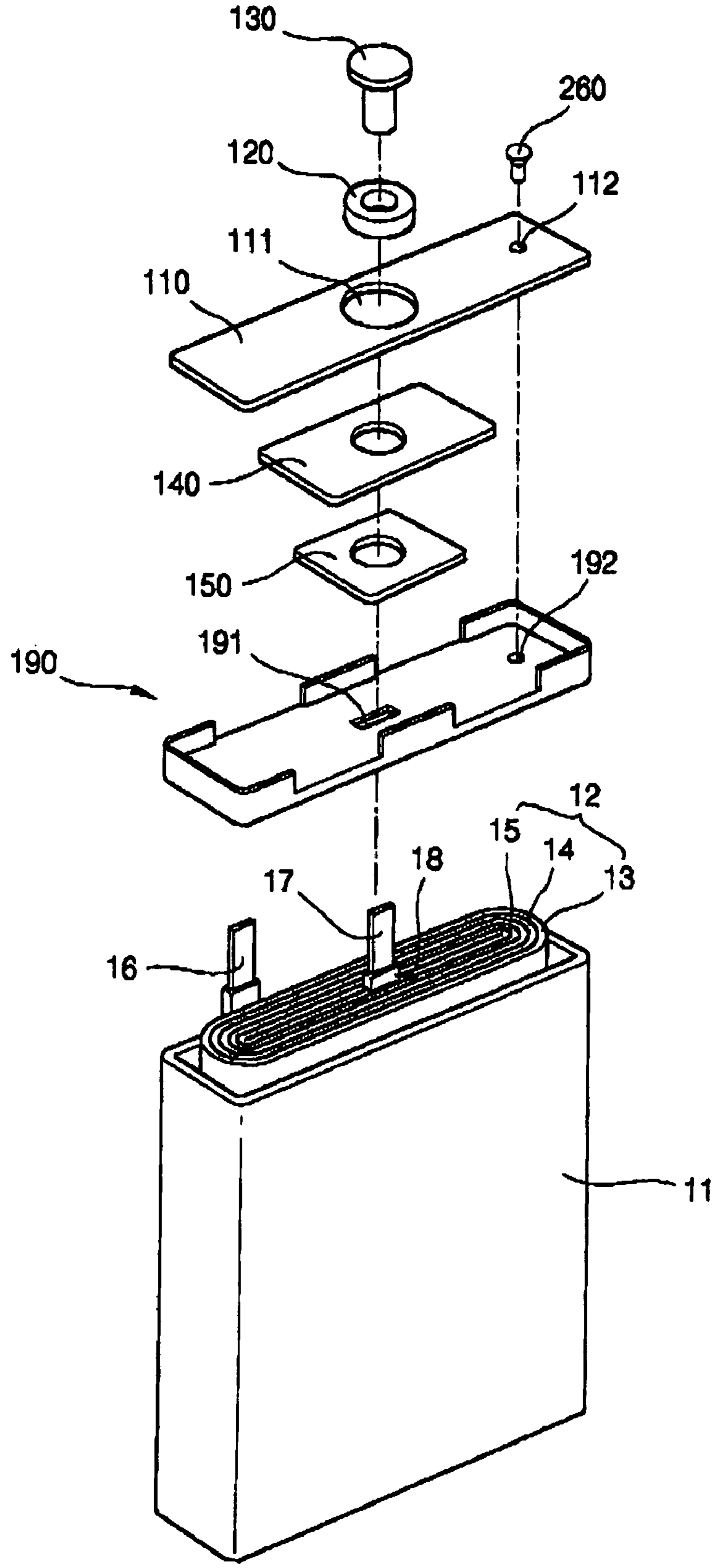
FIG. 4 is an exploded perspective view showing a square type lithium ion secondary battery according to an exemplary embodiment of the present invention.

Referring to FIG. 4, the square type lithium ion secondary battery includes an electrode assembly 12 having a cathode 13, a separator 14 and an anode 15, a can 11 for receiving the electrode assembly 12 therein, and a cap assembly coupled with the can 11.

In order to fabricate the electrode assembly 12, the cathode 13 and the anode 15 are formed in large plate shapes for increasing electric capacity and the separator 14 is interposed between the cathode 13 and the anode 15. Then, the stacked structure is spirally wound, forming the electrode assembly 12 in the form of a jelly roll. The separator 14 is placed on an upper surface of the cathode 13 or the anode 15 before the electrode assembly is wound in order to prevent the anode 15 from making contact with the cathode 13.

The cathode 13 includes a positive electrode collector made from a thin metal having a good conductivity, such as aluminum foil, and positive electrode active materials typically composed of lithium-based oxide and coated on both surfaces of the positive electrode collector. A positive electrode lead 16 is electrically connected to a predetermined portion of the positive electrode collector which does not contain positive electrode active materials.

The anode 15 includes a negative electrode collector made from a thin metal having good conductivity, such as copper foil, and negative electrode active materials typically composed of carbon and coated on both surfaces of the negative electrode collector. A negative electrode lead 17 is electrically connected to a predetermined portion of the negative electrode collector which does not contain negative electrode active materials.

Polarities of the cathode 13 and the anode 15 and polarities of the positive electrode lead 16 and the negative electrode lead 17 may be interchanged with each other. An insulation tape 18 is wound around an interfacial surface between the positive and negative electrode leads 16 and 17 and an upper surface of the electrode assembly 12 in order to prevent a short circuit between the cathode 13 and the anode 15.

The separator 14 may be made from polyethylene, polypropylene or copolymer of polyethylene and polypropylene. In one exemplary embodiment, the separator 14 has a width larger than the width of the cathode 13 and the anode 15, in order to prevent a short circuit between the cathode 13 and the anode 15.

As shown in FIG. 4, the can 11 of the square type lithium ion battery may be a metal container having a substantially hexahedral shape and may be fabricated through a deep drawing process. The can may act as a terminal. The can is preferably made from aluminum or an aluminum alloy having light weight, superior conductivity and superior endurance against erosion. However, it is also possible to fabricate the can 11 by using iron. The can 11 is a container for receiving the electrode assembly 12 and the electrolyte. At an upper portion of the can 11, there is an opening to receive the electrode assembly 12 and which is sealed by means of the cap assembly. In a cylinder type lithium ion battery, the can may have a cylindrical shape.

The cap assembly includes a flat plate type cap plate 110 having a size and a shape corresponding to the opening section of the can 11. The cap plate 110 is, in one embodiment, made from aluminum or an aluminum alloy for improving weldability with respect to the can 11. The cap plate 110 has a centrally located perforated hole 111 which is adapted to receive an electrode terminal 130. The electrode terminal 130 passes through the perforated hole of the cap plate 110. A gasket 120 having a tube shape is installed around the electrode terminal 130 to electrically insulate the electrode terminal 130 from the cap plate 110. An insulation plate 140 is installed below the cap plate 110 in the vicinity of the center of the cap plate 110 and a terminal plate 150 is aligned below the insulation plate 140.

The positive electrode lead 16 is electrically connected to the cap plate 110 by welding and the negative electrode lead 17 is electrically connected to the electrode terminal 130 by welding. The electrode terminal 130 is insulated from the cap plate 110 by the gasket 120, while the negative electrode lead 17 is folded into a serpentine shape. The positive and negative electrode leads 16, 17 may be electrically connected to a positive temperature coefficient (PTC) device and a protective circuit module, respectively, according to their polarity.

An insulation case 190 is installed on an upper surface of the electrode assembly 12 to electrically insulate the electrode assembly 12 from the cap assembly and to cover an upper portion of the electrode assembly 12. The insulation case 190 is made from high polymer resin having an insulation property, and in one exemplary embodiment, the insulation case 190 is made from polypropylene. The insulation case 190 has a centrally located lead hole 191 for allowing a center portion of the electrode assembly 12 and the negative electrode lead 17 to pass through. In addition, the insulation case 190 has an electrolyte hole 192 formed on one side. The electrolyte hole 192 may be omitted if a lead hole for the positive electrode lead 16 is formed besides the lead hole 191.

An electrolyte injection hole 112 is formed at one side of the cap plate 110. The electrolyte injection hole 112 is sealed by a plug 260 after the electrolyte has been injected into the can 11.

The plug 260 is formed by mechanically press-fitting a ball member made from aluminum or an aluminum alloy into the electrolyte injection hole 112. Thus, the plug 260 has a diameter larger than that of the electrolyte injection hole 112. Laser welding is carried out with respect to a welding section formed between the electrolyte injection hole 112 and the plug 260.

A method for fabricating the secondary battery having the above structure will now be described. First, the electrode assembly 12 having the cathode 13, the separator 14, the anode 15 and the separator 14 stacked sequentially is wound in the form of a jelly roll. The electrode assembly 12 is then inserted into the square type can 11.

The insulation case 190 is then placed on an upper surface of the electrode assembly 12. The positive electrode lead 16 and the negative electrode lead 17 are withdrawn out of the insulation case through the lead hole 191.

The cap assembly is then coupled with the opening section of the can 11. First, the electrode terminal 130 and the gasket 120 provided at an outer peripheral portion of the can are inserted into the cap plate 110 through the perforated hole 111. Then, the electrode terminal 130 is electrically connected to the terminal plate 150 positioned below the cap plate 110 by placing the insulation plate 140 therebetween.

The positive electrode lead 16 is directly welded to a lower surface of the cap plate 110 and the negative electrode lead 17 is welded to a lower end of the electrode terminal 130 while the negative electrode lead 17 is folded in a serpentine shape.

The cap plate 110 is then welded to the can 11, electrically connecting the can 11 to the cathode 13 and the positive electrode lead 16 and the cap plate 110, so that the can 11 has a positive polarity. In addition, the electrode terminal 130 is electrically connected to the anode 15, the negative electrode lead 17 and the terminal plate 150, so that electrode terminal 130 has a negative polarity.

The electrolyte is then injected into the can 11 through the electrolyte injection hole 112. After the electrolyte has been injected into the can 11, a ball is placed on the electrolyte injection hole 112 in order to seal it. The ball is inserted into the electrolyte injection hole 112 through a mechanical press-fitting process forming the plug 260 in the electrolyte injection hole 112. In order to improve the sealing of the electrolyte injection hole 112, the plug is welded to the cap plate 110.

Figure 5:
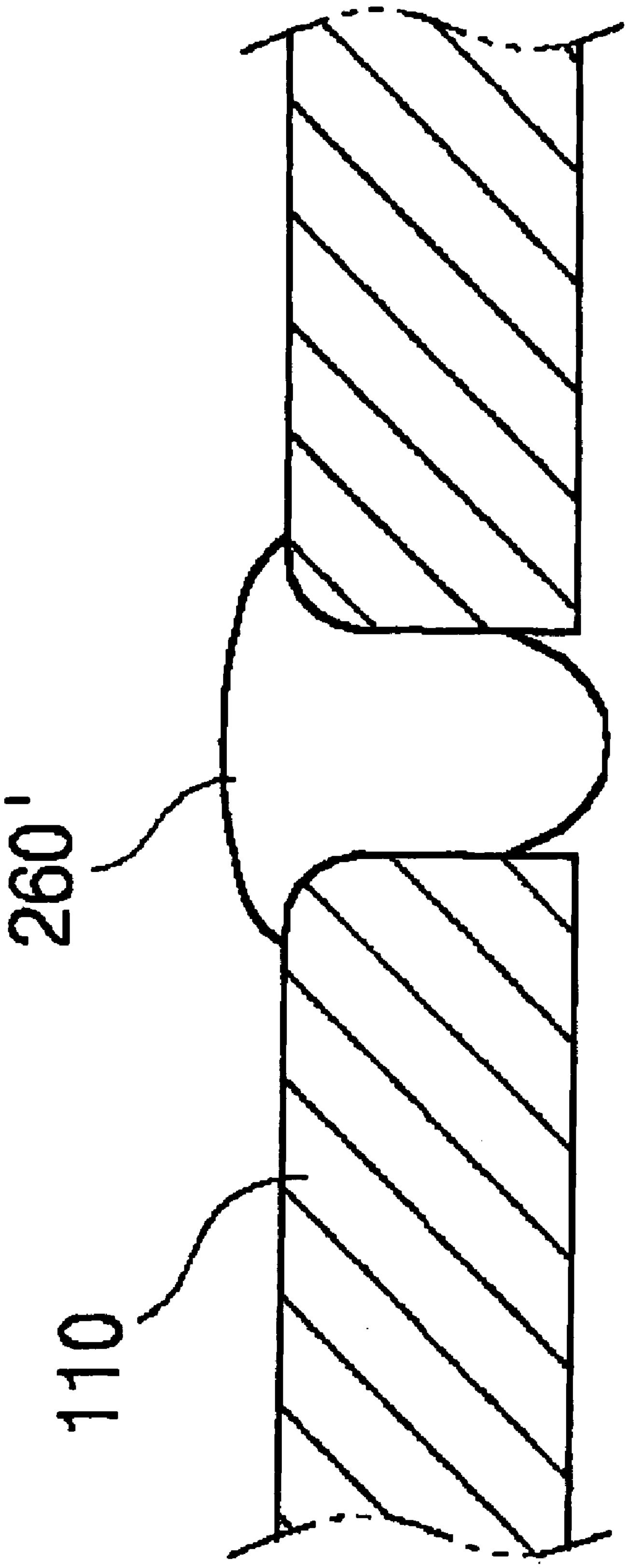
FIGS. 5 and 6 are partial sectional views showing coupling states between an electrolyte injection hole and a plug in a press-fitting step and a welding step, respectively, according to an exemplary embodiment of the present invention.
Figure 6:
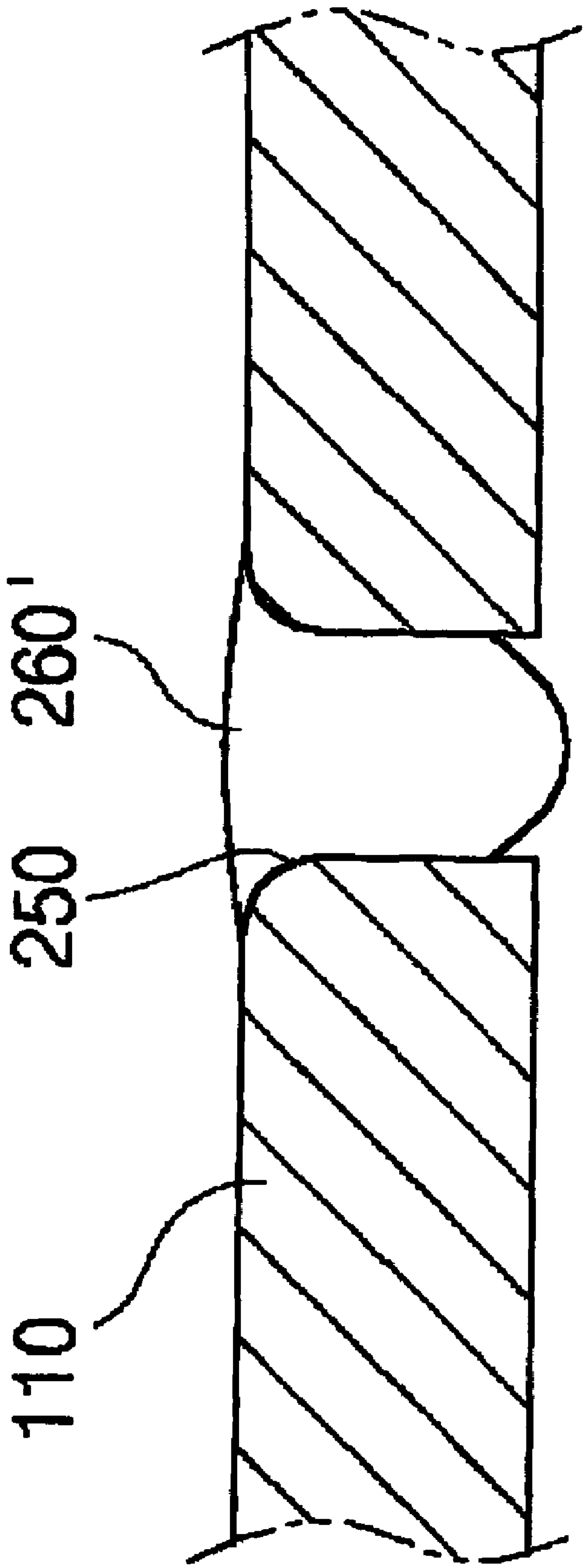

FIGS. 5 and 6 are partial sectional views showing coupling states between the electrolyte injection hole and the plug in a press-fitting step and a welding step, respectively, according to an exemplary embodiment of the present invention.

Referring to FIG. 6, the cap plate 110 is made from aluminum and has a thickness of about 0.8 mm for achieving a slimmer and high-capacity battery. An inclined section 250 may be formed at an inlet section of the electrolyte injection hole. Alternatively, an inner wall of the electrolyte injection hole may be formed in a straight structure without forming the inclined section. The aluminum ball used for sealing the electrolyte injection hole includes a soft aluminum ball. The aluminum ball is made from 1070 Al which is softer than 1050 Al. Softness of the aluminum ball may increase by performing the ball forming process with 1070 Al in an argon atmosphere. The soft aluminum ball has a Vickers hardness value (HV) of about 26.

Since the ball is made from soft aluminum, the ball may be easily press-fitted into the electrolyte injection hole even if the cap plate 110 is made from an aluminum plate having a thickness of about 0.8 mm. Thus, a portion of the ball protruding the cap plate 110 man be reduced after the press-fitting process has been carried out. In addition, the now-created plug 260 may make close, uniform contact with an inner wall of the electrolyte injection hole. Pressure applied to the ball is typically used for deforming the ball, not for deforming the cap plate. Therefore, since the ball is formed from a softer material, the amount of pressing force necessary may be reduced, preventing the cap plate 110 from being deformed or damaged by the pressing force.

In order to press-fit the soft aluminum ball into the electrolyte injection hole, an air cylinder driving method or a cam driving method may be used. The air cylinder driving method uses a punch driven by an air cylinder to strike the soft aluminum ball. On the other hand, the cam driving method uses a punch driven by a cam to strike the soft aluminum ball. In particular, according to the cam driving method, the punch is engaged with the cam having an oval shape so that the punch is reciprocated within a predetermined distance as the cam rotates. Thus, little pressing force is rapidly and frequently applied to the soft aluminum ball, distributing the striking force. Accordingly, the pressing force applied to the cap plate is also reduced, thereby minimizing deformation of the cap plate.

Since the plug 260 formed by the ball makes close contact with the entire inner wall of the electrolyte injection hole, the electrolyte does not remain between the plug 260' and the electrolyte injection hole and a gap through which the electrolyte may leak is not formed between the plug 260' and the electrolyte injection hole.

In this state, if the plug 260 is welded to the cap plate 110, it is possible to obtain a densely packed welding section as shown in FIG. 6. Accordingly, leakage of the can type secondary battery caused by spatter and a gap may be effectively prevented.

Tables 1 to 3 represent Vickers hardness values of a general aluminum plate, a conventional 1050 Al ball, and a 1070 Al ball (D=1.1 mm), respectively, measured by a micro hardness tester. At this time, the Hv values are typical Vickers hardness values achieved through dividing the weight of a standard pyramid type indenter by a multiple of the length of first and second diagonal lines, and then multiplying the resultant value by 1.854.

TABLE 1

(General Aluminum Plate)

| D1(length of 1st diagonal line) | D2(length of 2nd diagonal line) | Hv |
|---|---|---|
| 28.6 | 27.9 | 58.0 |
| 30.1 | 27.7 | 55.5 |
| 27.8 | 27.6 | 60.4 |
| 25.7 | 26.4 | 68.3 |
| 27.5 | 29.8 | 56.4 |
| Average Hv | | 59.7 |

TABLE 2

(1050 Al)

| D1(length of 1st diagonal line) | D2(length of 2nd diagonal line) | Hv |
|---|---|---|
| 43.5 | 42.6 | 25 |
| 38 | 38.7 | 31.5 |
| 38.3 | 39.8 | 31.1 |
| 41.2 | 40.5 | 27.7 |
| 38.1 | 37.8 | 32.1 |
| Average Hv | | 29.5 |

TABLE 3

(1070 Al)

| D1(length of 1st diagonal line) | D2(length of 2nd diagonal line) | Hv |
|---|---|---|
| 41.5 | 41.4 | 26.9 |
| 41.8 | 41.9 | 26.4 |
| 40.9 | 42.1 | 26.9 |
| 43.8 | 44.1 | 24.0 |
| 43.1 | 42.4 | 25.3 |
| Average Hv | | 25.9 |

As is understood from the above tables, the soft aluminum ball of the present invention is about 15% softer than a conventional aluminum ball. In addition, the soft aluminum ball of the present invention has Vickers hardness values less than 27 and an average Vickers hardness value of about 26. However, the conventional aluminum ball typically has Vickers hardness values exceeding 27, and an average Vickers hardness value of about 29.5.

As described above, the secondary battery of the present invention may solve the problems occurring in the prior art such as welding failure in the welding section formed between the cap plate and the can, a gap, and leakage of the electrolyte created between the electrolyte injection hole of the cap plate and the plug.

According to an exemplary embodiment of the present invention, it is possible to prevent the welding section formed between the electrolyte injection hole and the plug from being contaminated during a welding process due to the electrolyte filled in the welding section while preventing the pinhole from being created in the welding section.

According to another exemplary embodiment of the present invention, the electrolyte may be prevented from being leaked from the can type secondary battery, thereby improving reliability of the can type secondary battery.

Although embodiments of the present invention have been described for illustrative purposes, those skilled in the art will appreciate that various modifications, additions and substitutions are possible without departing from the scope and spirit of the invention as disclosed in the accompanying claims.

What is claimed is:

1. A can type secondary battery comprising:

an electrode assembly including a positive electrode plate, a negative electrode plate, and a separator interposed between the positive electrode plate and the negative electrode plate;

a can for receiving the electrode assembly; and a cap assembly coupled to the can, the cap assembly including a cap plate formed with an electrolyte injection hole and a soft aluminum plug welded to the electrolyte injection hole so as to seal the electrolyte injection hole, wherein the soft aluminum plug has an average Vickers hardness value of less than 26 when measured by a micro hardness tester;

wherein the cap plate has a thickness less than or equal to 1 mm; and wherein the soft aluminum plug contacts a substantially entire inner wall surrounding the electrolyte injection hole.

2. The can type secondary battery as claimed in claim 1, wherein the soft aluminum plug is formed from 1070 Aluminum.

3. The can type secondary battery as claimed in claim 1, wherein the cap plate is made from aluminum or an aluminum alloy.

4. The can type secondary battery as claimed in claim 1, wherein the soft aluminum plug is formed by press-fitting a soft aluminum ball into the electrolyte injection hole, and wherein a height of an upper portion of the plug protruding from an upper surface of the cap plate is less than or equal to 0.15 mm.

5. The can type secondary battery as claimed in claim 1, wherein the cap plate is welded to the soft aluminum plug through spot welding or laser welding.

* * * * *